US011656851B2

(12) United States Patent
Clement et al.

(10) Patent No.: US 11,656,851 B2
(45) Date of Patent: May 23, 2023

(54) LONG-RANGE MODELING OF SOURCE CODE FILES BY SYNTAX HIERARCHY

(71) Applicant: MICROSOFT TECHNOLOGY LICENSING, LLC., Redmond, WA (US)

(72) Inventors: Colin Bruce Clement, Seattle, WA (US); Neelakantan Sundaresan, Bellevue, WA (US); Alexey Svyatkovskiy, Bellevue, WA (US); Michele Tufano, Bellevue, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 27 days.

(21) Appl. No.: 17/507,808

(22) Filed: Oct. 22, 2021

(65) Prior Publication Data

US 2023/0128200 A1    Apr. 27, 2023

(51) Int. Cl.
  *G06F 9/44*    (2018.01)
  *G06F 8/33*    (2018.01)
(52) U.S. Cl.
  CPC ..................... *G06F 8/33* (2013.01)
(58) Field of Classification Search
  None
  See application file for complete search history.

(56) References Cited

U.S. PATENT DOCUMENTS

| 8,516,458 | B2 * | 8/2013 | Stewart | G06F 8/427 717/145 |
| 10,983,761 | B2 | 4/2021 | Svyatkovskiy et al. | |
| 2020/0249918 | A1 * | 8/2020 | Svyatkovskiy | G06N 3/084 |
| 2020/0341755 | A1 * | 10/2020 | Woulfe | G06F 8/71 |
| 2021/0034335 | A1 | 2/2021 | Svyatkovskiy et al. | |
| 2021/0279042 | A1 * | 9/2021 | Allamanis | G06N 3/0445 |
| 2022/0358286 | A1 * | 11/2022 | Wilson-Thomas | G06F 40/284 |

OTHER PUBLICATIONS

"Reformat and Rearrange Code", Retrieved from: https://www.jetbrains.com/help/idea/reformat-and-rearrange-code.html, Apr. 17, 2021, 10 Pages.
"Visual Studio IntelliCode", Retrieved from: https://web.archive.org/web/20210824004308/https:/visualstudio.microsoft.com/services/intellicode/. Aug. 24, 2021, 6 Pages.
Alon, et al., "Code2seq: Generating Sequences from Structured Representations of Code", In Repository of arXiv:1808.01400v1, Aug. 4, 2018, pp. 1-22.

(Continued)

*Primary Examiner* — Anna C Deng

(57) ABSTRACT

The syntax elements of a source code program used to represent the context of a focal method are selected based on a priority order. The selected syntax elements are input into a fixed-size context window that is used to train a neural transformer with attention model to learn to generate source code and used by the neural transformer model to generate source code. The context window contains prioritized sequences of tokens that extend beyond the target focus in order to provide a longer visibility back into the source code program for the model to learn predictive patterns. This gives the model a file-level context of the source code program without increasing the size of the context window.

20 Claims, 11 Drawing Sheets

(56) References Cited

OTHER PUBLICATIONS

Asaduzzaman, Muhammad, "Context-Sensitive Code Completion", In Dissertation of the Department of Computer Science University of Saskatchewan Saskatoon, Jan. 2018, 148 Pages.
Beltagy, et al.,"Longformer: The Long-Document Transformer", In Repository of arXiv:2004.05150v1, Apr. 10, 2020, 17 Pages.
Brown, et al., "Language Models are Few-Shot Learners", In Repository of arXiv:2005.14165v1, May 28, 2020, 75 Pages.
Bruch, et al., "Learning from Examples to Improve Code Completion Systems", In Proceedings of the 7th Joint Meeting of the European Software Engineering Conference and the ACM SIGSOFT Symposium on the Foundations of Software Engineering, Aug. 23, 2009, pp. 213-222.
Choromanski, et al., "Rethinking Attention with Performers", In 9th International Conference on Learning Representations, ICLR, May 3, 2021, 38 Pages.
Clement, et al., "PyMT5: Multi-Mode Translation of Natural Language and Python Code with Transformers", In Proceedings of the Conference on Empirical Methods in Natural Language Processing, EMNLP, Nov. 16, 2020, 14 Pages.
Das, et al., "Contextual Code Completion Using Machine Learning", In the Technical Report, 2015, 6 Pages.
Devlin, et al., "Bert: Pre-training of Deep Bidirectional Transformers for Language Understanding", In Repository of arXiv:1810.04805v1, Oct. 11, 2018, 14 Pages.
Dongfang, Li, "Deep Learning based Code Completion with ASTToken2Vec", In Tokyo Institute of Technology Mathematical and Computing Science, Jul. 2019, 78 Pages.
Drain, et al., "Generating Bug-Fixes Using Pretrained Transformers", In Repository of arXiv:2104.07896v1, Apr. 16, 2021, 11 Pages.
Feng, et al., "Codebert: A Pre-Trained Model for Programming and Natural Languages", In Proceedings of the Conference on Empirical Methods in Natural Language Processing: Findings, EMNLP, Nov. 16, 2020, 12 Pages.
Franks, et al., "CACHECA: A Cache Language Model Based Code Suggestion Tool", In IEEE/ACM 37th IEEE International Conference on Software Engineering, vol. 2, May 16, 2015, 4 Pages.
Hellendoorn, et al., "When Code Completion Fails: A Case Study on Real-World Completions", In IEEE/ACM 41st International Conference on Software Engineering (ICSE), May 25, 2019, 11 Pages.
Husain, et al., "CodeSearchNet Challenge: Evaluating the State of Semantic Code Search", In Repository of arXiv:1909.09436v1, Sep. 20, 2019, 6 Pages.
Kanade, et al., "Learning and Evaluating Contextual Embedding of Source Code", In International Conference on Machine Learning, Nov. 21, 2020, 21 Pages.
Kitaev, et al., "Reformer: The Efficient Transformer", In 8th International Conference on Learning Representations, ICLR, Apr. 26, 2020, pp. 1-12.
Kudo, et al., "SentencePiece", Retrieved from: https://web.archive.org/web/20210724194603/https:/github.com/google/sentencepiece, Jul. 24, 2021, 13 Pages.
Lewis, et al., "Bart: Denoising Sequence-To-Sequence Pre-Training for Natural Language Generation, Translation, and Comprehension", In Repository of arXiv:1910.13461v1, Oct. 29, 2019, 10 Pages.
Lewis, et al., "Pre-Training Via Paraphrasing", In Repository of arXiv:2006.15020v1, Jun. 26, 2020, 14 Pages.
Lewis, et al., "Retrieval-Augmented Generation for Knowledge-Intensive Nlp Tasks", In Repository of arXiv:2005.11401v1, May 22, 2020, 18 Pages.
Liu, et al., "Modeling Programs Hierarchically with Stack-Augmented LSTM", In Journal of Systems and Software, Jun. 2020, 17 Pages.
Lu, et al., "CodeXGLUE: A Machine Learning Benchmark Dataset for Code Understanding and Generation", In Repository of arXiv:2102.04664v1, Feb. 9, 2021, 14 Pages.
Moreno, et al., "Automatic Generation of Natural Language Summaries for Java Classes", In 21st International Conference on Program Comprehension (ICPC), May 20, 2013, pp. 23-32.
Moreno, et al., "Automatic Generation of Release Notes", In Proceedings of the 22nd ACM SIGSOFT International Symposium on Foundations of Software Engineering, Nov. 16, 2014, pp. 484-495.
Parmar, et al., "Image Transformer", In International Conference on Machine Learning, 2018, 10 Pages.
Radford, et al., "Improving Language Understanding by Generative Pre-Training", Retrieved from: https://www.es.ubc.ca/~amuham01/LING530/papers/radford2018improving.pdf, 2018, 12 Pages.
Rajpurkar, et al., "Squad: 100,000+ Questions for Machine Comprehension of Text", In Repository of arXiv:1606.05250v1, Jun. 16, 2016, 10 Pages.
Raychev, et al., "Probabilistic Model for Code with Decision Trees", In ACM SIGPLAN Notices, vol. 51, No. 10, Nov. 2, 2016, pp. 731-747.
Scalabrino, et al., "Automatically Assessing Code Understandability: How Far are We?", In Proceedings of the 32nd IEEE/ACM International Conference on Automated Software Engineering, Oct. 30, 2017, pp. 417-427.
Svyatkovskiy, et al., "Intellicode Compose: Code Generation Using Transformer", In Proceedings of the 28th ACM Joint Meeting on European Software Engineering Conference and Symposium on the Foundations of Software Engineering, Nov. 8, 2020, pp. 1433-1443.
Svyatkovskiy, et al., "Pythia: AI-assisted Code Completion System", In Proceedings of the 25th ACM SIGKDD International Conference on Knowledge Discovery & Data Mining, Aug. 4, 2019, pp. 2727-2735.
Tufano, et al., "Generating Accurate Assert Statements for Unit Test Cases using Pretrained Transformers", In Repository of arXiv:2009.05634v1, Sep. 11, 2020, 10 Pages.
Vaswani, et al., "Attention is All You Need", In Journal of Advances in Neural Information Processing Systems, Dec. 4, 2017, 11 Pages.
Veselin, et al., "Code Completion with Statistical Language Models", In Proceedings of the 35th ACM SIGPLAN Conference on Programming Language Design and Implementation, Jun. 9, 2014, pp. 419-428.
Wan, et al., "Improving Automatic Source Code Summarization Via Deep Reinforcement Learning", In Proceedings of the 33rd ACM/IEEE International Conference on Automated Software Engineering, Sep. 3, 2018, pp. 397-407.
Wang, et al., "Performer-Pytorch", Retrieved from: https://web.archive.org/web/20201101021356/https:/github.com/lucidrains/performer-pytorch, Nov. 1, 2020, 6 Pages.
Wang, et al., "Reformer-Pytorch", Retrieved from: https://web.archive.org/web/20201106135906/https:/github.com/lucidrains/reformer-pytorch, Nov. 6, 2020, 19 Pages.
Zaheer, et al., "Big Bird: Transformers for Longer Sequences", In 34th Conference on Neural Information Processing Systems (NeurIPS), Dec. 6, 2020, 15 Pages.
Zhai, et al., "CPC: Automatically Classifying and Propagating Natural Language Comments via Program Analysis", In Proceedings of the ACM/IEEE 42nd International Conference on Software Engineering, May 23, 2020, pp. 1359-1371.
Clement, et al., "Long-Range Modeling of Source Code Files with eWASH: Extended Window Access by Syntax Hierarchy", In Proceedings of the Conference on Empirical Methods in Natural Language Processing, Nov. 7, 2021, pp. 4713-4722.

* cited by examiner

LONG-RANGE MODELING OF SOURCE CODE FILES BY SYNTAX HIERARCHY

BACKGROUND

Neural transformer models are used to solve a variety of problems that involve analyzing sequential data to detect patterns that can be used to make predictions. Neural transformer models are used in software development tasks where the model predicts output sequences, such as a line of source code, a method body, or a code summary (i.e., docstring). The model learns from inputs that are sequences of source code tokens that represent the correct syntactic structure of a source code snippet. These input sequences form a context window that the model uses to learn to recognize patterns to make predictions.

There is a finite size on the number of source code tokens that can be used in a context window that is applied to a model. The context window is the span of tokens that the model considers during training and uses to generate outputs during inference. The size of the context window affects the accuracy of the model. A large context window provides more context from which the model learns about the structure of the sequence thereby generating more accurate results.

However, increasing the size of the context window of a neural transformer model presents problems. A neural transformer model has an attention mechanism that considers all possible pairs of tokens in the context window to understand the relationship between them. The assessment of a large number of token pairs is impractical since it requires storing the output of each model layer which becomes prohibitively large. Additionally, the larger-sized context window requires an enormous amount of computing resources to train the model and to make a prediction which may be not be practical.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A prioritized list of syntax elements of a source code program is used to represent the context of a focal method that is then modeled by a deep learning model to predict source code. The prioritized syntax elements represent those source code elements more closely associated with a focal method and include source code elements defined outside of the focal method. The prioritized syntax elements provide a deep learning model, with a fixed-size context window, a larger effective view back into the source code program for the model to learn predictive patterns that are used to generate source code.

The syntax elements selected to populate a context window for a focal method are chosen either by prioritizing higher-level hierarchical syntax elements, or by using a distance measure that determines the closest similar syntax elements to a focal method. In one aspect, a pre-configured prioritized list of syntax elements is used to specify the order of populating the syntax elements into a context window. In another aspect, a bi-encoder is trained to generate a joint embedding space that includes embeddings of the features of a focal method with the embeddings of the syntax elements that represent the context of the focal method. Those syntax elements having a closest similar embedding to the focal method embedding are selected in a ranked order to populate the context window.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
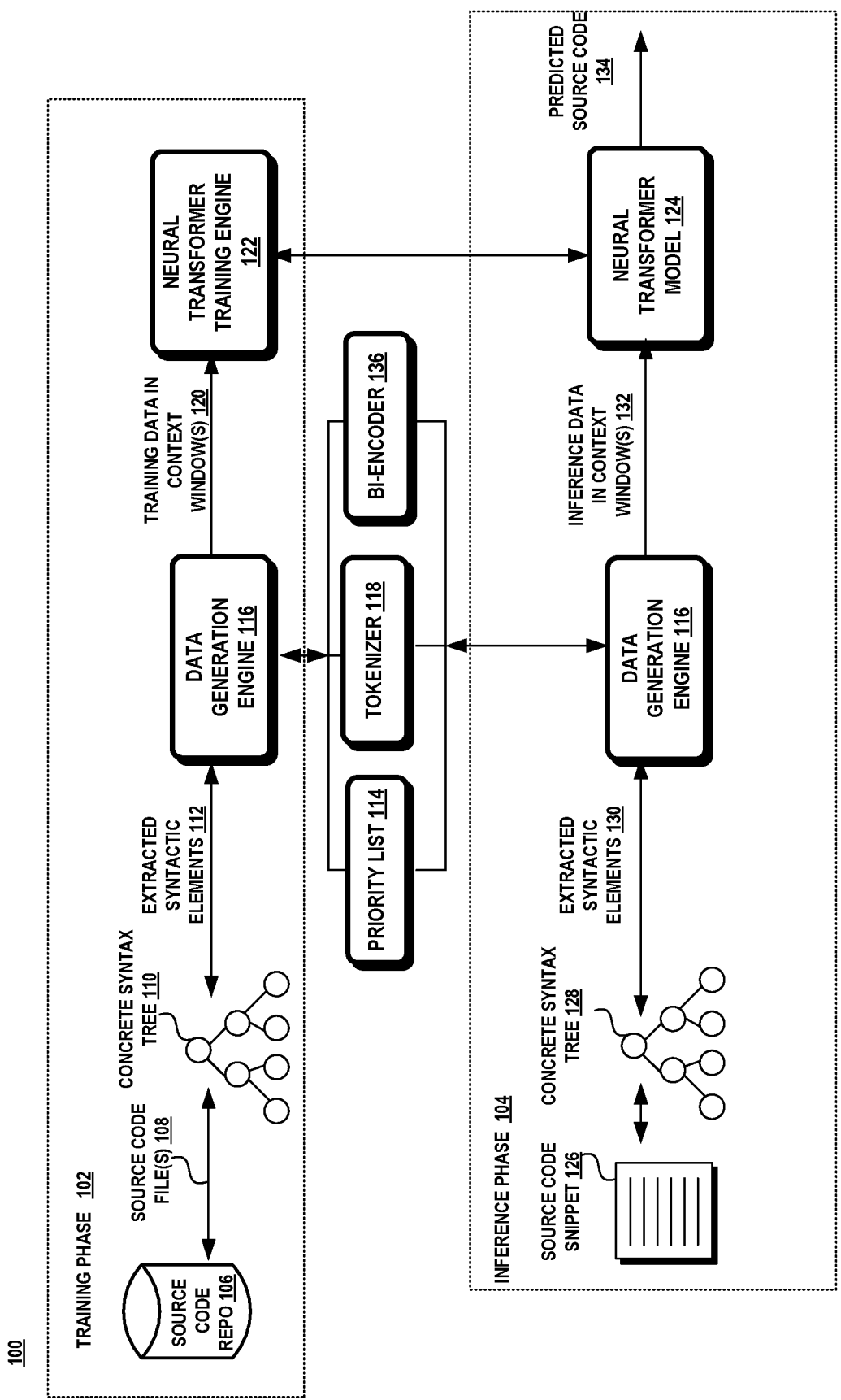
FIG. 1 is a schematic diagram illustrating an exemplary system for generating a context window having prioritized sequences of tokens to train a deep learning model and to use as input for the generation of source code.

The subject matter pertains to the selection of syntax elements to represent the context of a focal method of a source code program for use with neural networks having a fixed-size context window. Some neural networks utilize a fixed-size context window which contains input sequences to train the neural network to learn patterns to make predictions. The context window sets how far back in the source code program the model looks to find predictive patterns.

Often, the context includes input sequences within a close range of a target focus. Instead of increasing the size of the context window to cover more context, the context window contains prioritized sequences of tokens that extend beyond the target focus in order to provide a longer visibility back into the source code program for the model to learn the predictive patterns. In this manner, the model is given a longer view back into the context of the source code program, or file-level context, without increasing the size of the context window.

A software engineering task is an automated activity used to create, develop, maintain, and/or test source code. Source code understanding is needed in a variety of software engineering tasks, such as, without limitation, method completion, documentation/code generation, bug classification, bug patching, code search, and line completion. Most source code is written inside methods and for this reason, the training dataset used to train a model for a software engineering task focuses on the methods of a program. Hence, a focal method is a particular method that is the target focus for training a deep learning model to learn the syntactic structure and semantics of source code and using the deep learning model to make predictions.

However, a method is influenced by other elements which are not defined within a close proximity or range of its method signature, such as global import statements which often reside at the top of the source code file. In order to capture a wider range of features representative of a method, the technique uses a syntax hierarchy to prioritize those syntax elements or features of a source code program that are used as the context of a focal method.

The technique disclosed herein is described with respect to the software engineering tasks of code completion, method body completion and code summarization. However, it should be noted that the techniques described herein are not construed to these tasks.

Code completion is a tool that attempts to predict the next string of characters that a developer (e.g., user, end-user, programmer, etc.) may type into a source code development tool, such as a source code editor, integrated development environment, and the like. Source code may consist of various elements (e.g., keywords, delimiters, variables, methods, constants, operators, etc.) that are combined in a particular order in accordance with the grammar of the underlying programming language to form an expression. Code completion is used to complete a partially-formed source code snippet, such as a line of source code, a method invocation, a method signature, or a method body. A deep learning model is trained to learn the syntactic structure and semantics of a programming language to predict the code that completes a partially-formed source code snippet.

Method body completion is the task of predicting the contents of a method body in the context contained by a method signature, which is a structured label, and optionally, a natural language description of the inputs and outputs of the method (i.e., document string). The deep learning model predicts the programming language instructions that implement a method signature.

Code summarization or docstring completion is the task of predicting the contents of a documentation string for a method in the context contained by a corresponding method signature and optionally, the method body corresponding to the method signature.

Software engineering tasks all require an understanding of source code. Source code differs from a natural language (e.g., English) since programmers use, at times, arbitrary, complex and long names to represent a variable, function or other code elements. Source code can be learned from a large unsupervised abundant corpus of code snippets from different programming languages and/or from natural language code summaries from which a neural transformer model learns statistical properties of the source code, such as syntactic rules of the programming languages, as well as semantic information from co-occurrence of specific variable and method names.

The input sequences used to train the deep learning model are extracted from a source code file that is parsed into a concrete syntax tree from which a set of syntax elements are extracted. A priority list indicates the order in which the syntax elements are extracted and input into the context window and hence, used as the context of a focal method. A syntax element is a construct in the programming language of a source code program. A syntax element is a sequence of contiguous source code tokens which correspond to a set of concrete syntax tree nodes.

The term scope or lexical scope used in computer science refers to the part of the source code program where the binding of a name to an element (variable, method, constant, etc.) is defined. A local scope refers to when an element is defined within a method or function where it is used and a global scope refers to when an element is defined outside of the method where it is used. The syntax hierarchy of the priority list places certain elements in a program over other elements and may include elements of the source code program that are part of the local scope of another method in the program. Syntax elements of other scopes, such as a method or class defined outside of a focal method, may be included in the context of a focal method if used within the focal method or related to the focal method, such as being of a peer class to the focal method or being part of the same class as the focal method.

In one aspect, an exemplary syntax hierarchy includes the following prioritize order of syntax elements for each focal method: (1) method signature of the focal method, the docstring of the focal method, if any, and the class name of the focal method; (2) global import statements; (3) assigned values, but not the assigned expression; (4) class attributes; (5) peer class method signatures, which are the method signatures of the same class as the focal method; (6) class docstring, if any, is the doctoring of the class of the focal method; (7) peer class method docstrings, if any, are the docstrings of the methods of the same class as the focal method; (8) global expressions; and (9) source code bodies of peer class methods of the focal method.

In another aspect, the priority order of the syntax elements selected to populate a context window is based on a distance measure. A bi-encoder jointly learns embeddings for sequences of tokens representing the features of a focal method (e.g., method signature, docstring, class name) and the embeddings for each sequence of tokens representing a syntax element of a focal method. A distance computation, such as cosine similarity, is computed for the focal method feature embedding and each syntax element embedding. The syntax elements are ranked according to their distance computation, from closest distance to furthest distance. The syntax elements that populate the context portions of a context window are selected based on their rank until the context window is filled to capacity.

Attention now turns to a more detailed description of the system, components, methods and device used in the long-range modeling of source code files by syntax hierarchy.

System

FIG. 1 illustrates a block diagram of an exemplary system 100 in which various aspects of the invention may be practiced. As shown in FIG. 1, system 100 includes a training phase 102 in which components are used to train a deep learning model, such as a neural transformer model, and an inference phase 104 that utilizes the model for source code generation.

The training phase 102 may utilize one or more source code repositories 106 to extract source code files 108 from which samples of source code snippets are obtained. A source code repository 106 may be a file archive and web hosting facility that stores large amounts of source code either privately or publicly. A source code repository 106 can be structured as a version control system, such as GIT, Mercurial, etc. The source code files residing in the source code repository 106 vary and may be written in different programming languages. The selected source code files 108 can come from different domains, such as without limitation, scientific computing, web development, dataflow programming, machine learning, and the like.

A parser (not shown) transforms each of the selected source code files 108 into a concrete syntax tree 110. The concrete syntax tree 110 represents the source code in parsed form. The concrete syntax tree 110 may also be a parse tree. A concrete syntax tree 110 represents the syntactic structure of a program in a hierarchical or tree structure. The concrete syntax tree 110 is an n-ary tree data structure that includes nodes that represent a construct in the grammar of the programming language of a program. The concrete syntax tree 110 includes one root node, multiple internal nodes, and multiple terminal nodes. The terminal nodes represent the tokens. A token is a symbol that represents an operand or an operator. The concrete syntax tree 110 differs from an abstract syntax tree where the terminal nodes only represent operands.

The data generation engine 116 uses a priority list 114 for a target task to extract the syntax elements 112 from the concrete syntax tree in the order set forth in the priority list 114. The data generation engine 116 extracts each syntax element in the prioritized order, tokenizes each syntax element, and places it into the context window 120. The process is repeated until the context window is filled to capacity.

In another aspect, the data generation engine 116 uses a bi-encoder 136 to generate a prioritized list of syntax elements to populate the context window. The bi-encoder 136 generates an embedding or encoding for the focal method features and for each of the syntax elements associated with a focal method. Those syntax elements having an embedding closest to the focal method features embedding are selected to include in the context portion of the context window.

The tokenizer 118 generates a subtoken for each token in an extracted syntax element. The frequently-used elements in a programming language are encoded into tokens and the less frequently-occurring elements are encoded into combinations of characters referred to as subtokens. For simplicity, the term subtoken shall include tokens and subtokens.

The tokenized sequences in the context window 120 are then input to a neural transformer training engine 122. The neural transformer training engine 122 applies the training data in the context window 120 to train the neural transformer model 124 to learn how to generate source code from detecting patterns in the training data.

During the inference phase 104, the trained neural transformer model 124 is given a sequence of tokens in one or more context windows 132 from which the model will predict source code for an intended task. A source code snippet 126 is parsed into a concrete syntax tree 128 from which certain syntax elements are extracted by the data generation engine 116 in accordance with the priority list 114 or the embedding distance measure. The data generation engine 116 then fills one or more context windows with the tokenized syntax elements 130. The data in the context window is then transmitted to the neural transformer model 124 to generate source code or a code summary 134.

Attention now turns to a description of the neural transformer models.

Neural Transformer Models

A neural transformer with attention model is one distinct type of machine learning model. Machine learning pertains to the use and development of computer systems that are able to learn and adapt without following explicit instructions by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks. Neural transformers models are one type of deep learning that utilizes an attention mechanism. Attention directs the neural network to focus on a subset of features or tokens in an input sequence thereby learning different representations from the different positions of the tokens in an input sequence. The neural transformer model handles dependencies between its input and output with attention and without using recurrent neural networks (RNN) (e.g., long short-term memory (LSTM) network) and convolutional neural networks (CNN).

It should be noted that the term neural transformer model and neural transformer with attention model are used interchangeably. It should also be noted that the aspects disclosed herein are described with respect to neural transformer with attention models. However, the techniques are not limited to these types of neural networks and can be applied to other types of deep learning models that utilize a neural network with a fixed-size context window.

There are various configurations of a neural transformer model with each configuration suited for a particular software engineering task. In the exemplary software engineering tasks, the method completion and code summarization tasks utilize an encoder-decoder neural transformer model architecture and the code completion task utilizes a decoder-only neural transformer model architecture.

Method body completion and code summarization are sequence-to-sequence tasks where the model learns an intermediate function that can perform the translation of an input sequence of one domain into an output sequence of another domain. The architecture for a sequence-to-sequence task will have a stack of encoder blocks and a stack of decoder blocks. The encoder encodes the input sequences of the first domain into an internal representation and the decoder blocks decodes the internal representation into a target domain.

Figure 2:
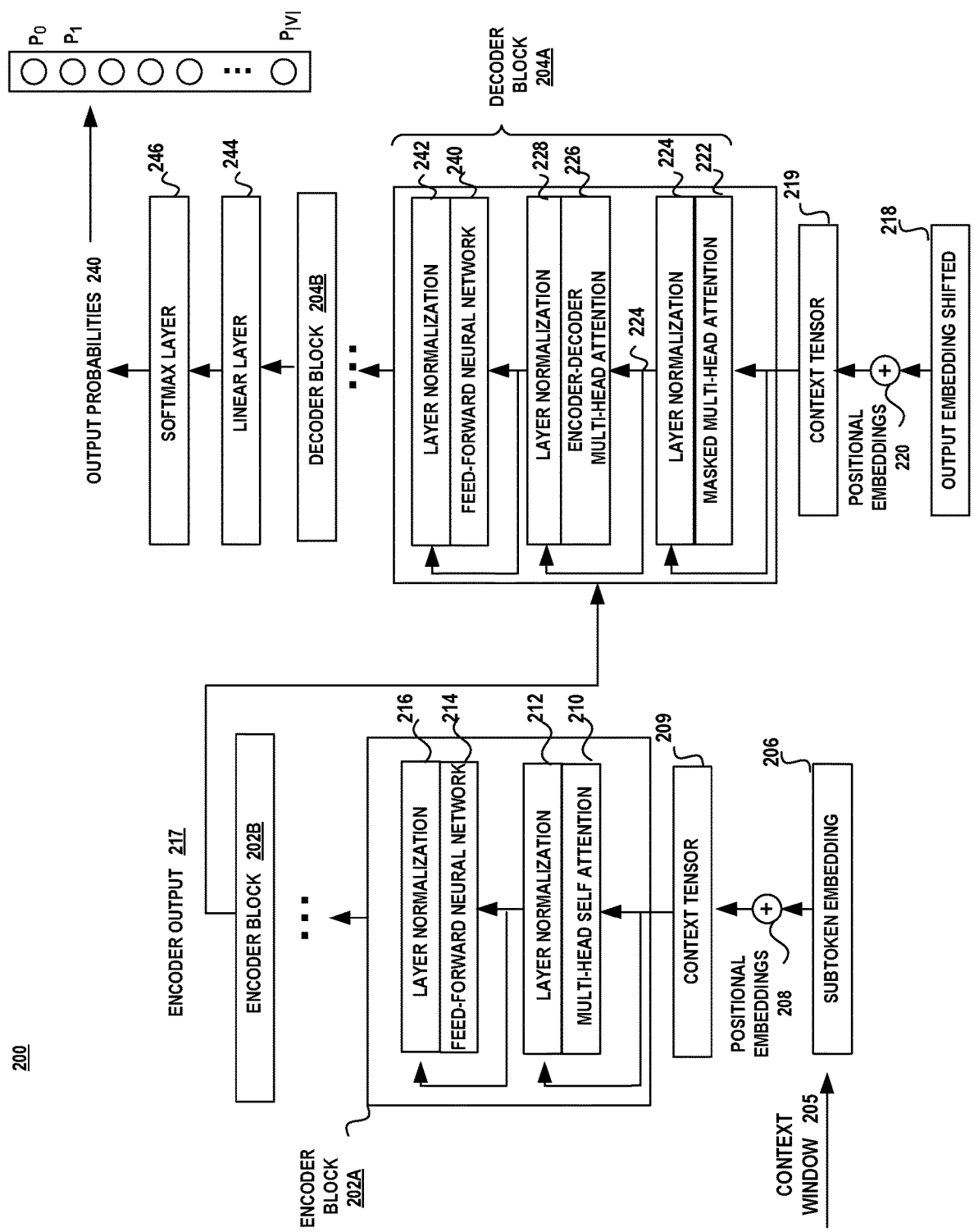
FIG. 2 is a schematic diagram illustrating an exemplary architecture of a deep learning model as an encoder-decoder neural transformer with attention model.

FIG. 2 shows an exemplary structure of the neural transformer model in an encoder-decoder configuration. The neural transformer model 200 contains one or more encoder blocks 202A-202B ("202") and one or more decoder blocks 204A-204B ("204"). The initial inputs to the first encoder block 202A are the input embeddings 206 of the input sequence of a context window 205. In order to retain the order of the tokens in the input sequence, positional embeddings 208 are added to the input embedding 206 forming a context tensor 209. The initial inputs to the decoder block 204 are a shifted sequence of the output embeddings 218 from the previous time step to which the positional embeddings 220 are added forming context tensor 219.

An encoder block 202 consists of two layers. The first layer includes a multi-head attention component 210 followed by layer normalization component 212. The second layer includes a feed-forward neural network 214 followed by a layer normalization component 216. The context tensor 209 is input into the multi-head attention layer 210 of the encoder block 202 with a residual connection to layer normalization 212. The output of the layer normalization 212 is input to the feed forward neural network 214 with another residual connection to layer normalization 216. The output of the encoder block 202 is a set of hidden representations 217. The set of hidden representations 217 is then sent through additional encoder blocks, if multiple encoder blocks exist, or to the decoder 204.

Attention is used to decide which parts of the input sequence are important for each subtoken, especially when decoding long sequences since the encoder is limited to encoding a fixed-size vector. Attention mechanisms gather information about the relevant context of a given subtoken and then encode that context into a vector which represents the subtoken. It is used to identity the relationships between subtokens in the long sequence while ignoring other subtokens that do not have much bearing on a given prediction.

The multi-head self-attention component 210 takes a context tensor 209 and weighs the relevance of each subtoken represented in the context tensor to each other by generating attention weights for each subtoken in the input embedding 206. In one aspect, the attention function is scaled dot-product attention which is described mathematically as follows:

$$\text{Attention } (Q, K, V) = \text{softmax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one subtoken in a sequence, K is the vector representations of all subtokens in the sequence, and V is the vector representations of all the subtokens in the sequence.

The queries, keys and values are linearly projected h times in parallel with $d_v$ output values which are concatenated to a final value:

$$\text{MultiHead}(Q,K,V)=\text{Concat}(\text{head}_1,\ldots,\text{head}_h)W^o,$$

where $\text{head}_i=\text{Attention}(QW_i^Q,KW_i^K,VW_i^V)$, with parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_k}$, and $W^O \in \mathbb{R}^{hd_v \times d_{model}}$.

In order to reduce the training time of the neural transformer, layer normalization is used between the layers. The layer normalization component normalizes the inputs across the features. The mean and standard deviation is computed across the feature dimensions. There is a first layer normalization 212 that precedes the feed forward neural network 214 and a second layer normalization 216 that follows the feed forward neural network 214.

The feed-forward neural network 214 processes each output encoding separately 213. The output of the top encoder block is a set of attention vectors K and V 217 which is used by the encoder-decoder multi-head attention layer 226 of the decoder block 204.

The decoder block 204 predicts each subtoken $t_i$ in the target language one-by-one at each time step conditioned on all previously-generated target subtokens $t_1, \ldots, t_{i-1}$. The decoder block 204 consists of three layers. The first layer includes a masked multi-head attention component 222 followed by a layer normalization component 224. The output of the layer normalization component 224 is input into the encoder-decoder multi-head attention component 226 with a residual connection to layer normalization component 228. The second layer includes an encoder-decoder multi-head attention component 226 followed by a layer normalization component 228. The output of layer normalization component 228 is input into the feed forward neural network 230 with a residual connection to layer normalization component 232. The third layer includes a feed forward neural network 230 followed by a layer normalization component 232.

The masked multi-head attention component 222 receives the output embeddings of the previous timestep. The masked multi-head attention component 222 masks the output embeddings from future time steps. The encoder-decoder multi-head attention layer 226 receives queries from the previous decoder layer 225 and the memory keys and values 217 from the output of the encoder block 202. In this manner, the decoder block 204 can attend to every position of the input sequence. The feed-forward neural network 230 processes each output encoding separately. A layer normalization component 224, 228, 232 is used between the layers in order to normalizes the inputs across the features.

The linear layer 234 projects the vector produced by the stack of decoders into a logits vector. The softmax layer 236 then turns the scores of the logits vector into probabilities for each subtoken in the vocabulary V which are positive and normalized 238, $P_0, P_1, \ldots, P_{|V|}$.

In one aspect, the neural transformer model contains a stack of encoder blocks and a stack of decoder blocks which are aggregated into a neural transformer block. The output of each encoder block is passed onto the next encoder block and processed. Each decoder block receives the attention weights computed from the last encoder block. The use of multiple stacked encoder blocks and decoder blocks increases the model's capacity allowing the model to learn increasing levels of abstraction.

Code completion utilizes a decoder-only configuration of a neural transformer model since it is a language modeling task. A language modeling task is an autoregressive task where the model learns to predict the next token of a sequence based on the preceding tokens in the sequence. As an auto-regressive model, the model produces an output one element at a time based on the outputs of previous time steps. The model is used to predict a sequence of tokens $M=\{m_t\}$, $t=0 \ldots N$, conditioned on a code snippet typed into a source code editor $\{c_t\}$, $t=0 \ldots T$, based on the conditional probability distribution:

$$P(m_0,m_1,\ldots,m_N|c_0,\ldots,c_T)=\Pi_{i=1}^N P(m_i|c_0,c_1,\ldots c_T,m_{i-k},m_{i-k+1},\ldots,m_{i-1}).$$

With the autoregressive approach, the objective is to maximize the log-likelihood:

$L(M)=\Sigma_i \log P(m_i|c_0, c_1, \ldots, c_T, m_{i-k}, m_{i-k+1}, \ldots, m_{i-1}; \theta)$, where k is the length of the predicted code sequence and the conditional probability P is modeled using a neural transformer with parameters $\theta$. The parameters may include attention lengths, the number of attention heads, the number of decoder blocks, embedding dimensions, embedding matrices, and the number of hidden units per layer which are trained using a stochastic gradient descent optimization procedure.

Figure 3:
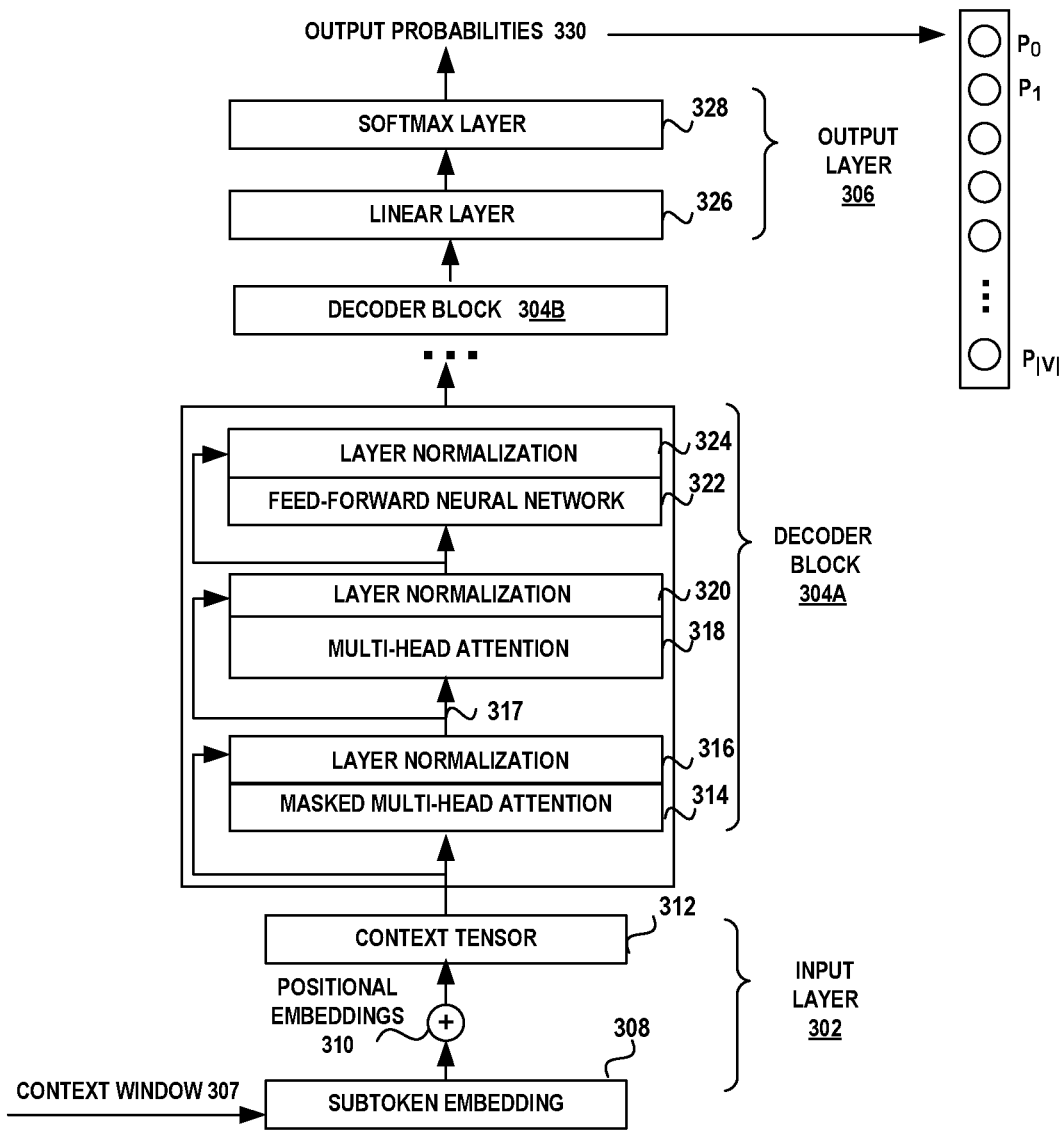
FIG. 3 is a schematic diagram illustrating an exemplary architecture of a deep learning model as a decoder-only neural transformer with attention model.

Referring to FIG. 3, the decoder neural transformer model 300 includes an input layer 302, one or more decoder blocks 304A-304B ("304"), and an output layer 306. A decoder block 304 consists of two layers. The first layer includes a masked self-attention component 314 followed by a layer normalization component 316. The input to the masked multi-head self-attention component 317 has a residual connection to layer normalization 320. The output of layer normalization is input into the feed forward neural network 322 with a residual connection to layer normalization component 324. The output of the feed forward neural network is input into layer normalization component 322.

Each token/subtoken flows through all the decoder blocks along its own path. The masked self-attention component 314 allows the neural network 322 to focus on certain features or inputs. The inputs to the decoder block are the subtoken embeddings 308 from the context window 307 which are added with the positional embeddings 310 forming context tensor 312. Each decoder block 304 predicts each token/subtoken $t_i$ in the target language one-by-one at each time step conditioned on all previously-generated target tokens/subtokens $t_1, \ldots t_{i-1}$.

The masked multi-head component 314 masks the output embeddings from future time steps. The feed-forward neural network 322 processes each output embedding separately. A layer normalization component 316, 324 is used between the layers in order to normalize the inputs across the features.

The output layer 306 includes a linear layer 326 and a softmax layer 328. The linear layer 326 projects the vector produced by the stack of decoders into a logits vector. The softmax layer 328 then turns the scores of the logits vector into probabilities for each token in the vocabulary V which are positive and normalized, $P_0, P_1, \ldots P_{|V|}$.

Attention now turns to a discussion of the configuration of the context window for each software engineering task.

Context Window Configuration

The data in the context window is used to train a neural transformer model and is used by the trained neural transformer model to generate source code (including docstrings). The data consists of various sequences of tokens representing syntax elements. The technique described herein is centered on a focal method and its related context that includes the syntax elements defined from a scope outside of the focal method.

The code completion task uses a decoder-only configuration of a neural transformer model to predict source code snippets likely to complete a partially-formed code snippet. The training data for the model includes samples that include a method signature, the corresponding method body, its docstring and a context that includes syntax elements denoted in a prioritized list for the code completion task. The code completion task may be used to complete a line of source code, a method signature, and/or a method body.

Method body completion is the task of predicting the contents of a method body in the context contained by a method signature, which is a structured label, and optionally, a natural language description of the inputs and outputs of the method (i.e., document string). A method signature contains a method name and optionally a parameter list. The method body contains the source code programming language statements that implement the method. A document string is a string associated with the method which is a natural language statement expressing the intent of the method, and sometimes a description of the input, outputs, or idiosyncratic behavior contained therein.

The training data for the method body completion model includes samples that include a focal method signature, its docstring and a context that includes syntax elements denoted in a prioritized list for the method body completion task. A prefix is attached to the sample that indicates the translation task that the model associates with the input sequence. For example, a prefix may include "#target method body" which indicates that the model is to correlate the input features in the context window to a method body.

The code summarization task predicts the contents of a documentation string for a method in a context that includes a corresponding method signature and optionally, a method body corresponding to the method signature. The documentation string or docstring is natural language text written in a particular style (e.g., reStructuredText, Javadoc style, numpydoc, etc.) describing the intended usage of a method (i.e., function, procedure), the method signature, the parameters needed to invoke the method, the types of the parameters, and/or the return value and type of the method. A code summarization style is a set of guidelines for writing code documentation. This is no universal standard for all programming languages and as such, there are various code summarization or documentation styles, such as reStructuredText, Javadoc style, numpydoc, etc. A source code program typically uses a particular code documentation style.

The training data for the code summarization model includes samples that include a focal method signature, its docstring and a context that includes syntax elements denoted in a prioritized list for the code summarization task. A prefix is attached to the sample that indicates the docstring style that the model associates with the input sequence. For example, a prefix may include "#reStructuredText" which indicates that the model is to correlate the input features in the context window to a docstring in the reStructuredText style.

It should be noted that the configuration of the context windows described herein and the priority orderings are exemplary and are shown herein to illustrate the techniques disclosed.

Figure 4A:
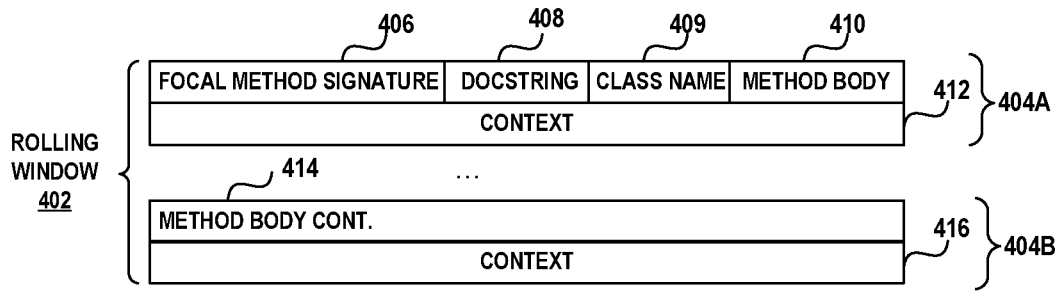
FIGS. 4A-4C are schematic diagrams illustrating exemplary configurations of a context window for a target software engineering task.
Figure 4B:
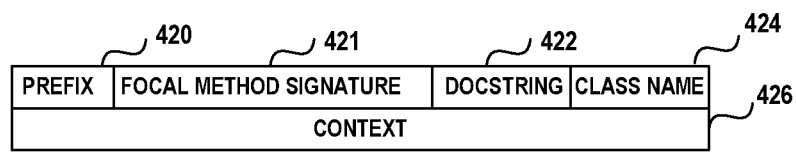
Figure 4C:
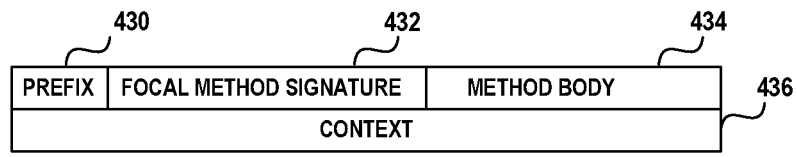

FIGS. 4A-4C illustrate exemplary configurations of a fixed-sized context window for each of the software engineering tasks. FIG. 4A illustrates an exemplary configuration of the context windows used for a code completion task, FIG. 4B illustrates an exemplary configuration of the context window used for a method body completion task and FIG. 4C illustrates an exemplary configuration of the context window used for a code summarization task.

For a code completion task, there is a rolling window across the focal method body. The rolling window may include multiple context windows. A first portion of a context window is used for the sequence of tokens of the focal method signature, its docstring and the focal method body (e.g., features of the focal method). The second portion of the context window is used for the sequence of tokens that represent the context. In the case where the method body exceeds the token limit of the first portion, additional context windows are generated to fill in the rest of the sequence of tokens of the focal method body into a context window.

For example, take the situation where the size of the context window is 1024 tokens. Then, the size of the second portion of the context window is ¾ of the context window or 768 tokens and the size of the first portion of the context window is ¼ of the context window or 256 tokens. If the focal method body exceeds 256 tokens, there would be multiple context windows for this method, or rolling windows, to input the complete method body.

Referring to FIG. 4A, there is shown the rolling window format 402 for the code completion task 400. There are two context windows in this example. The first context window 404A includes the sequence of tokens representing the features of the focal method, such as the focal method signature 406, its docstring 408, the class name of the focal method 409, and the method body 410. The context portion 412 contains the sequence of tokens that represent the prioritized syntax elements that make up the context for the focal method. If the sequence of tokens representing the method body does not fit in the first context window 404A, the remaining tokens of the method body are input into additional context windows 404B until the entire method body portion is contained in a context window.

Referring to FIG. 4B, there is shown an exemplary configuration of the context window for the method body completion task 418. For the method body completion task, there is a single context window. The size of the single context window T is partitioned into a first portion that contains the features of the focal method and a context portion that contains features of the context of the focal method. The first portion includes a pre-configured amount of tokens N and the context portion includes the remaining sequence of tokens up to the limit T-N. The first portion includes a prefix 420, focal method signature 422, docstring of the focal method 424, if any, and the class name of the focal method 424, if any. The context portion 426 includes the sequences of tokens extracted from a source code program in the order denoted in the priority list.

Referring to FIG. 4C, there is shown an exemplary configuration of the context window for the code summarization task 428. For the code summarization task, there is a single context window. The size of the single context window T is partitioned into a first portion including the features of the focal method and a context portion that includes the features of the context associated with the focal method. The first portion includes a pre-configured amount of tokens N and the context portion includes the remaining sequence of tokens up to the limit T−N. The first portion includes a prefix 430, a focal method signature 432, and a docstring of the focal method 434. The context portion 436 includes the sequences of tokens extracted from a source code program in the order denoted in the priority list. The prefix is used to denote the docstring style that is used to generate the predicted docstring.

Extraction of Syntax Elements

Figure 5:
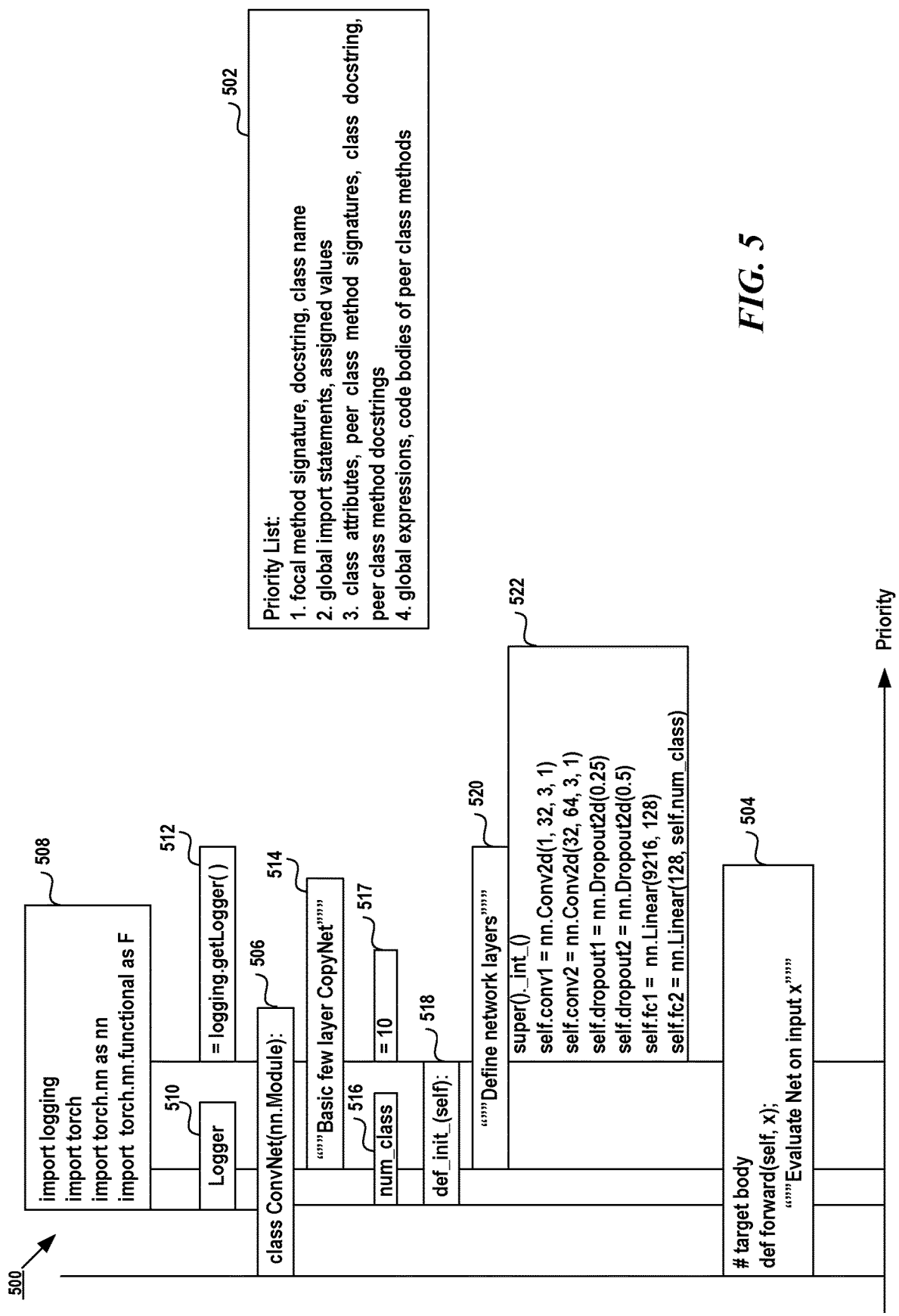
FIG. 5 is a schematic diagram illustrating the prioritization of syntax elements to populate a context window from a source code snippet.

FIG. 5 illustrates an exemplary source code program 500 and a corresponding priority list 502 for a method body completion task (i.e., forward(self, x)). The focal method is ConvNet.forward. The data extraction engine extracts syntax elements from the source code program in the order listed in the priority list. The extracted syntax elements are tokenized and input into a respective portion of a context window.

In this example, the data extraction engine extracts the prefix "#target body" and the docstring "Evaluate Net on input x" 504 and the class definition 506 in the first portion of the context window. The second portion of the context window includes the syntax elements in the following order: global import statements 508; assigned values, such as Logger 510, num_class 516, and def_init_(self) 518; peer class method docstrings—"Basic few layer CopyNet" 514 and "Define network layers" 520; global expressions 512, 517 (a global expression is what the global assignment is assigned to be); and the code body of peer class method, def_initi_(self) 522.

Training Phase—First Aspect

Figure 6A:
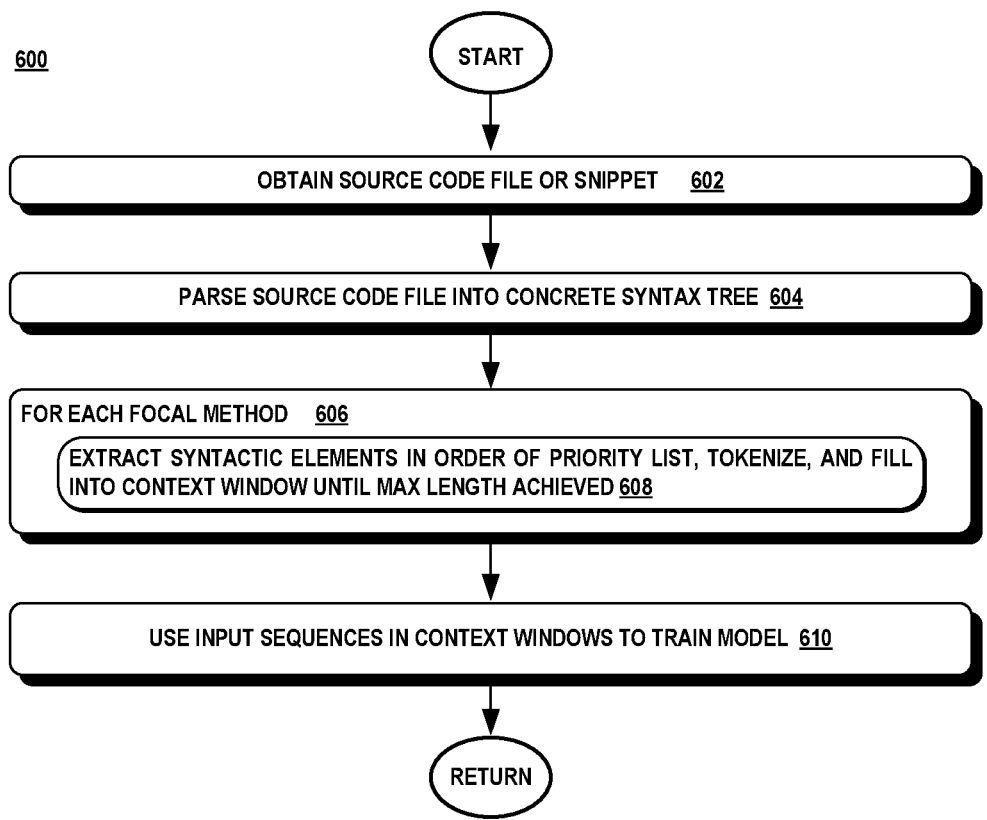
FIG. 6A is a flow diagram illustrating an exemplary method for generating a context window to train a neural transformer model and FIG. 6B is a flow diagram illustrating an exemplary method for generating a context window to input to the model to generate source code.

FIG. 6A illustrates an exemplary method 600 for generating a context window based on a syntax hierarchy. The method is used to generate training data that is loaded into one or more fixed-size context windows and applied to train a neural transformer model. The method is also used to generate the data that is loaded into one or more fixed-size context windows and used by the neural transformer model to predict or generate source code given a context and target task.

A source code snippet is obtained (block 602) and parsed into a concrete syntax tree (block 604). The source code snippet may be a source code program or a portion of a source code file. The data generation engine obtains a priority list for the intended software engineering task. For each method in the source code program (block 606), the data generation engine extracts sequences of tokens that represent a syntax element from the concrete syntax tree in the order denoted in the priority list (block 608). The sequence of tokens is tokenized into subtokens and filled into one or more context windows based on the format for the respective software engineering task (block 608). The data generation engine continues to perform the extraction and tokenization until the context windows are filled to capacity (block 608). The context windows are then used to train the neural transformer with attention model (block 610).

For the training phase, the training dataset consists of hundreds of samples that form hundreds of context windows that are applied to a respective neural transformer model. Neural transformer models are trained iteratively, making multiple passes over the training dataset before converging to a minimum. An epoch represents the entire training dataset passed forwards and backwards through the neural transformer block once. Since the training dataset is very large, it is partitioned into smaller batches. The training is iterative and the entire dataset is passed through the neural transformer in multiple iterations. Each training iteration includes forward propagation, loss calculation, backpropagation steps followed by updating the weights. The training dataset is partitioned into batches with each batch of input sequences from the context windows running through the training process. (Collectively, block 610).

The neural transformer model has multiple blocks and layers so that more detailed relationships within the data are learned as well as how the features interact with each other on a non-linear level. The model architecture, training procedure, data normalization and vocabulary encoding procedures are hyperparameters that are tailored to meet a particular objective. The values of the hyperparameters influence how the parameters are learned. (Collectively, block 610).

For each input sequence of each context window of each batch in each epoch, the T-ordered sequences of subtokens are then mapped into numeric vectors and then into respective subtoken embeddings and positional embeddings. An embedding is a learned representation for the text-based subtokens where subtokens that have a common meaning have a common representation. An embedding is a mapping of discrete categorical variables to a vector of continuous numbers. There is an embedding for each subtoken in the vocabulary and a corresponding positional embedding. The subtoken embedding represents the learned representation for the subtoken. The neural transformer model does not read each subtoken sequentially and as such, has no knowledge of the subtoken's position in a sequence without additional position information. The positional embedding is used to embed position information about a subtoken's position in a sequence into the neural transformer model. (Collectively, block 610)

Initial values are generated for the subtoken embedding and positional embeddings of each sequence which are then used to form a context tensor. Thereafter, the neural transformer model learns the values for each embedding. Upon the completion of the training phase, the embeddings for each subtoken and the positional embeddings are saved into respective matrices for later use. There is a subtoken embedding matrix, We, that contains an embedding vector for each subtoken $t_i$, i=0 . . . V, and a positional embedding matrix, Wp, that contains an embedding vector $P_j$, j=0 . . . T, for each position, where V is the size of the vocabulary and T is the length of the subtoken sequence. (Collectively, block 610).

For the encoder-decoder configuration of the neural transformer model, the first encoder block of the neural transformer model takes the context tensor as input and passes it through the multiple layers of multi-head attention, layer normalization and feed-forward neural network to finally produce a the set of hidden representations If there are additional encoder blocks, the output of each encoder block is passed onto the next encoder block with the output of the last encoder block producing the set of hidden representations. The set of hidden representations is passed onto each decoder block. (Collectively, block 610).

The decoder blocks of the neural transformer model take a shifted sequence of an output embedding as input. The masking in the masked multi-head attention layer is used to prevent positions from attending to subsequent positions in the future. The masking combined with the output embeddings shifted by one position ensures that the predictions to position T depend only on the known outputs at positions less than T. Starting with the first token of the output sequence, the subtokens are passed through the self-attention and normalization layers and into the encoder-decoder attention layer, serving as the query for encoder-decoder attention, where the key and value pairs for the attention are the outputs of encoder. The encoder output was calculated with the entire input embedding sequence. (Collectively, block 610).

The feed forward neural networks in the encoder blocks and the decoder blocks are trained iteratively, making multiple passes over the training dataset before converging to a minimum. Each training iteration includes forward propagation, loss calculation, backpropagation steps followed by updating the weights by calculating the weight gradients. The loss function estimates the loss or error which is used to compare how good or bad the predicted results are. In one aspect, a categorical cross-entropy loss function is used. Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of parameters of the function that minimizes the loss function. A backpropagation through time (BPTT) algorithm may be used to update the weights. (Collectively, block 610).

For the decoder-only configuration of the neural transformer model, the input sequences in each context window of each batch in each epoch are mapped into numeric vectors and then into respective subtoken embeddings and positional embeddings. Each token/subtoken flows through all the decoder blocks along its own path. (Collectively, block 610).

At the completion of each batch, the parameters of the neural transformer model are updated at a preconfigured frequency denoted as Naccum. Naccum is a gradient accumulation frequency and in one aspect has a value of 8. The parameters include the subtoken embeddings and the positional embeddings which are stored in a respective embedding matrix. (Collectively, block 610).

Next, the neural transformer model is validated. Before the neural transformer model is trained, a set of hyperparameters is selected randomly and then tuned to achieve a desired performance. The neural transformer model is tested using a validation dataset to determine the appropriate hyperparameters settings to achieve a desired goal. When the desired goal is not achieved, one or more hyperparameters are adjusted and the training is repeated until the target goal is achieved. Perplexity on the validation set is calculated to validate the performance of the model with respect to the learning the masked out original text. (Collectively, block 610).

Inference Phase—First Aspect

Figure 6B:
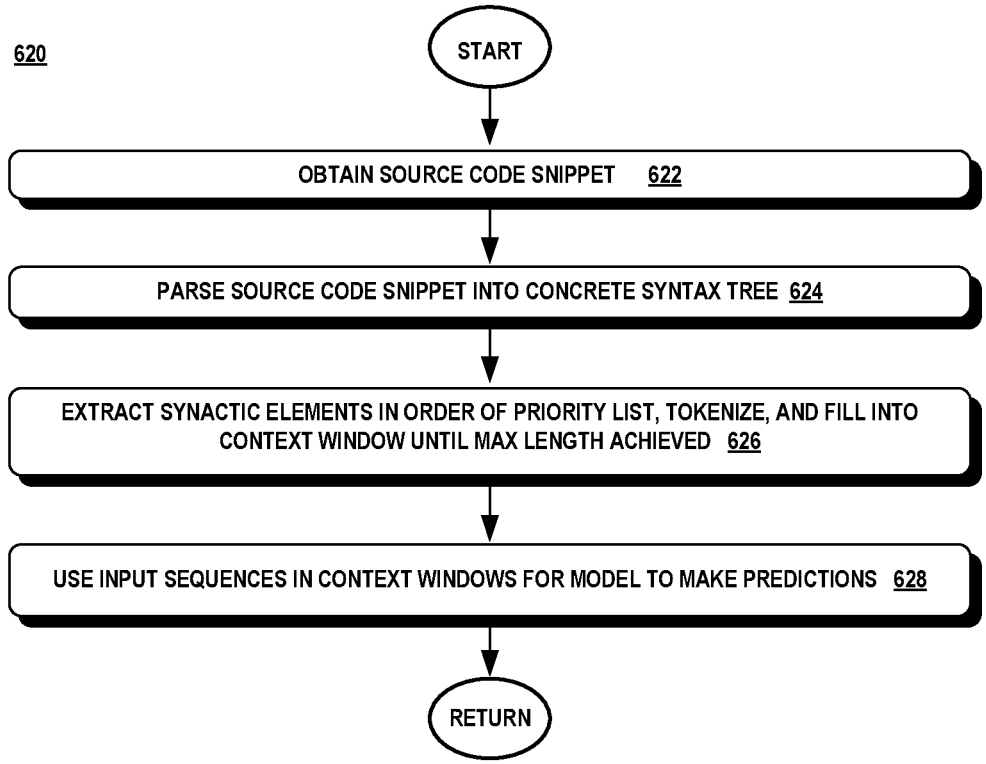

FIG. 6B illustrates an exemplary method 620 for generating a context window based on a syntax hierarchy for the model to use to generate predicted source code. A source code snippet is obtained (block 622) and parsed into a concrete syntax tree (block 624). The source code snippet may be a source code program or a portion of a source code file. The data generation engine obtains a priority list for the intended software engineering task. The data generation engine extracts sequences of tokens that represent a syntax element from the concrete syntax tree in the order denoted in the priority list (block 626). The sequence of tokens is tokenized into subtokens and filled into one or more context windows based on the format for the respective software engineering task (block 626). The data generation engine continues to perform the extraction and tokenization until the context windows are filled to capacity (block 626). The context windows are then applied to the neural transformer with attention model to make predictions (block 628).

In the inference phase, there is a limited number of context windows since the model is making a prediction given a particular context that is described in one or more context windows. The inference phase utilizes a beam search to find the most likely candidate sequences. A beam search iteratively generates tokens/subtokens by invoking the neural transformer model. The output of the neural transformer model is a matrix of token probabilities for each position in a candidate sequence. The beam search concentrates on the k most probable tokens at each iteration to get the best path to the most likely candidate sequence. At each iteration, each of the k most probable tokens are concatenated with the tokens in the preceding iterations to form a partial candidate sequence. (Collectively, block 628).

A beam search uses a breadth-first search to build a search tree. The search tree is composed of nodes at one or more inference levels. Each node represents a probability distribution generated by the neural transformer model for the tokens/subtokens in the model vocabulary. At each level, only the top k tokens/subtokens having the highest probabilities from the output distribution generated by the neural transformer model are expanded to the next inference level. The variable k is preconfigured and also referred to as the beam width. Each of the k subtokens/tokens is then expanded into a search that updates the current context sequence with the selected subtoken/token to input into the neural transformer model to generate an additional probability distribution for the next token in a sequence. This process is repeated until the end-of-line, end-of-method, and/or end-of-docstring token is predicted as being the next likely token candidate. (Collectively, block 628).

Training Phase—Second Aspect

Figure 7:
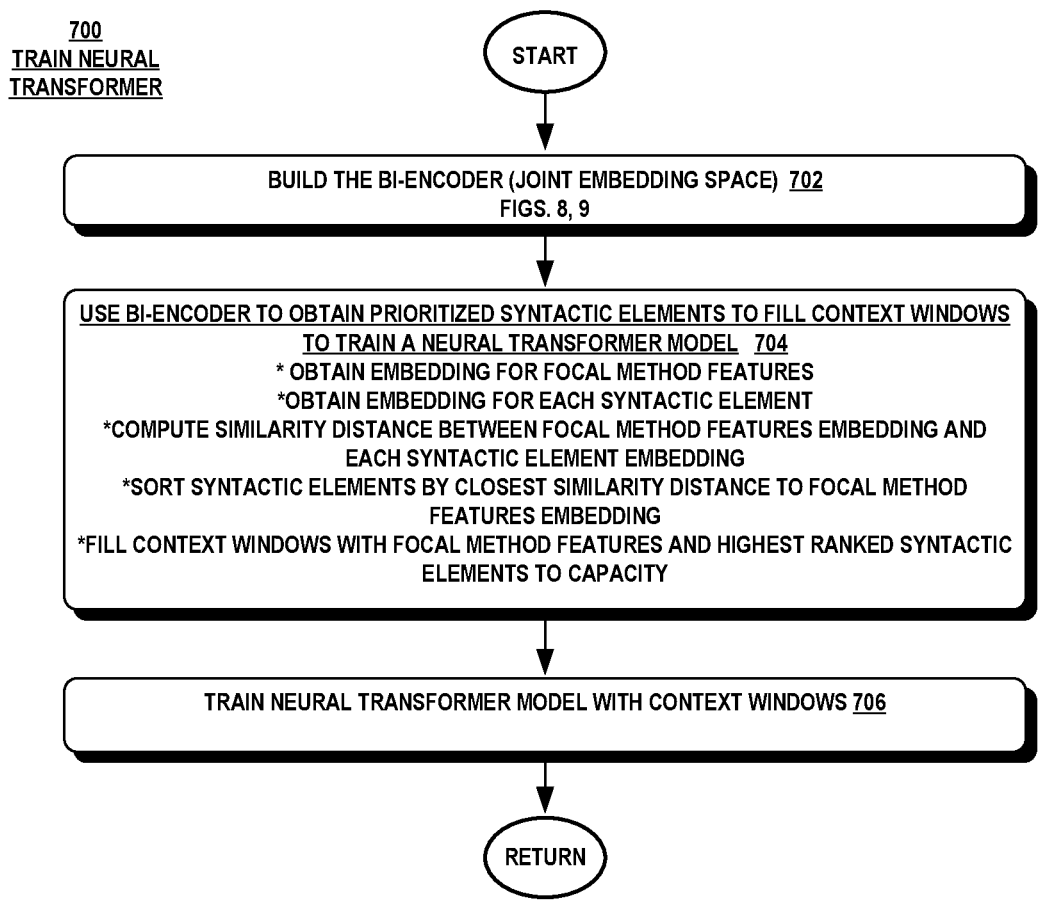
FIG. 7 is a flow diagram illustrating an exemplary method for training a neural transformer model with context windows having prioritized syntax elements based on a similarity distance measure.

FIG. 7 illustrates an exemplary method 700 of training a neural transformer with attention model with a fixed-sized context window having prioritized syntax elements based on a similarity measure with the features of the associated focal method.

Initially, a bi-encoder is built to generate the embeddings that represent a focal method and the embeddings of the syntax elements associated with the focal method (block 702).

Figure 8:
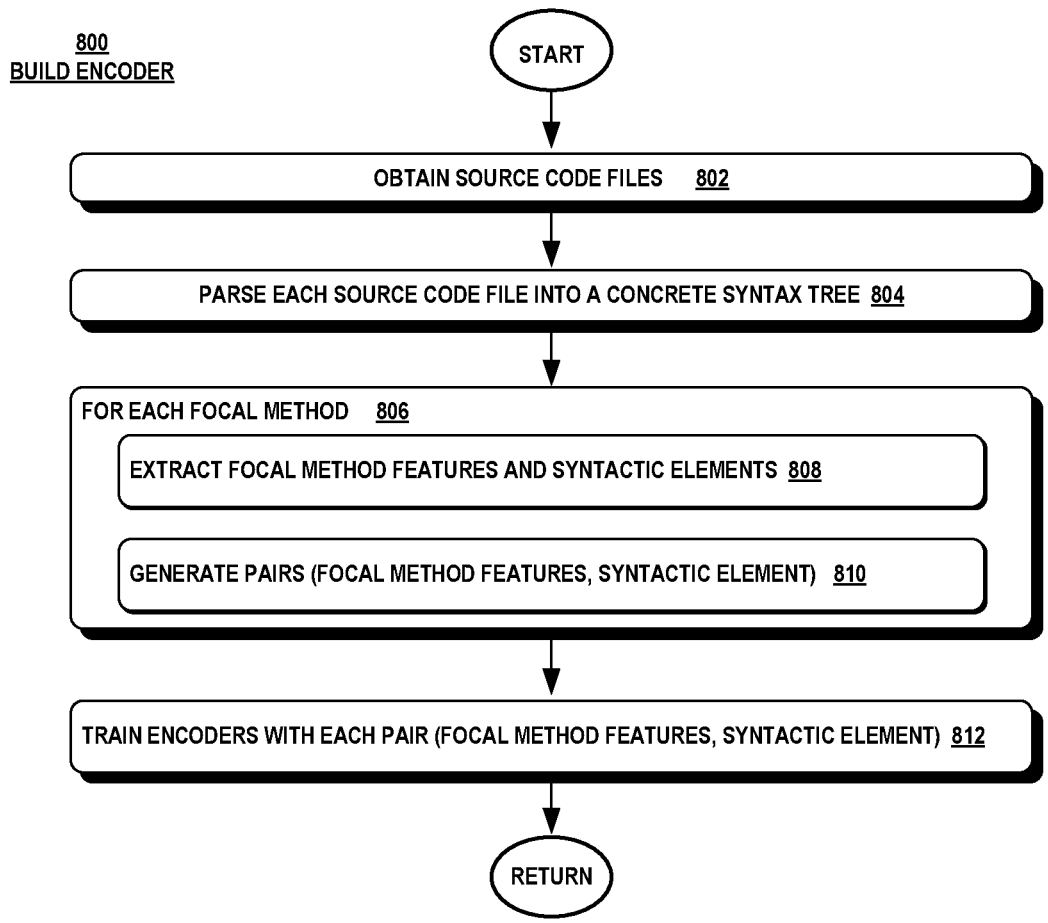
FIG. 8 is a flow diagram illustrating an exemplary method for building the bi-encoder.

Turning to FIG. 8, there is shown an exemplary method for constructing the bi-encoder. The bi-encoder is trained using focal methods extracted from source code files. A source code file is obtained (block 802) and parsed into a concrete syntax tree (block 804). For each focal method (block 806), the focal method features are extracted along with the syntax elements listed in the priority list (block 808) in order to generate pairs of encoding data. A pair includes the focal method features and a corresponding single syntax element (block 810). Each pair is then input into the bi-encoder and jointly trained to learn an embedding for the focal method feature and the corresponding syntax element (block 812).

Figure 9:
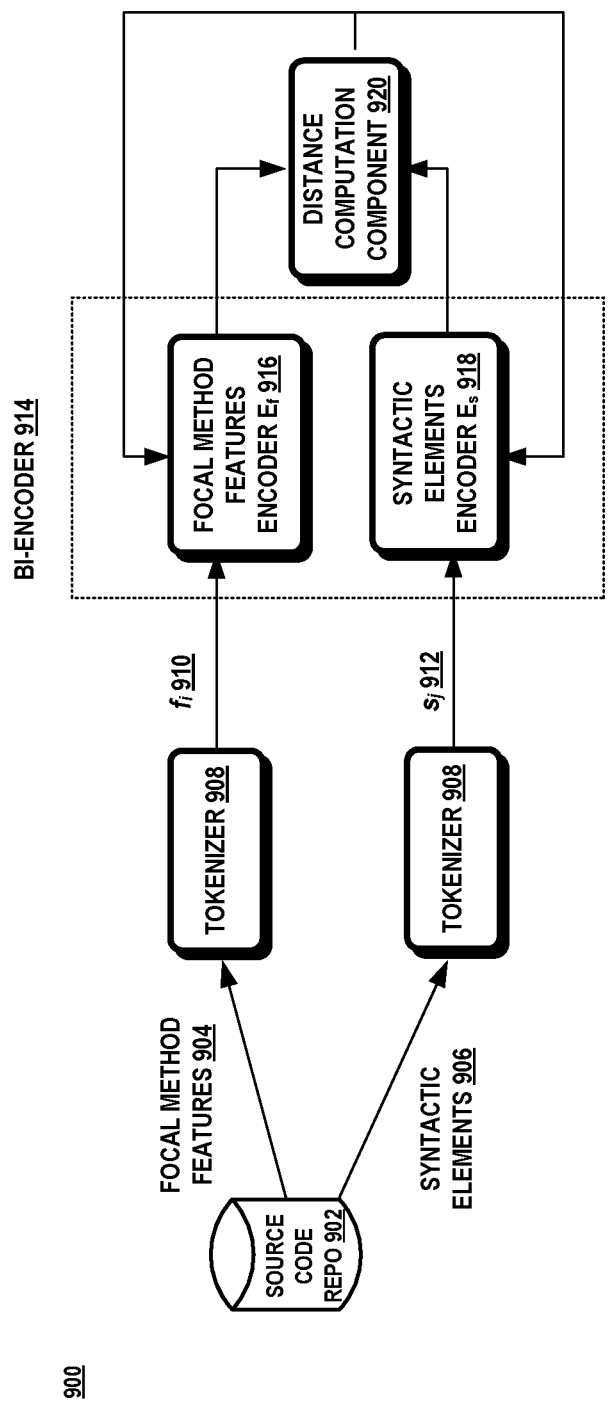
FIG. 9 is a schematic diagram illustrating the training of a bi-encoder used to generate a joint embedding space of focal method features and their corresponding syntactic features.

Turning to FIG. 9, focal methods are extracted from various source code files 902 and parsed into a concrete syntax tree. The extracted focal method features and each syntax element are tokenized by tokenizer 908 into a respective sequence of tokens 910, 912. The bi-encoder 914 jointly embeds the features of a focal method 904 and its corresponding syntax element 906 so they are mapped to a continuous vector space in which the features of the focal method 904 are close to its corresponding syntax element 906. The bi-encoder 914 uses a focal method encoder $E_f$ 916 to encode the sequence of tokens representing the features of a focal method 904 and a syntax element encoder $E_s$ 918 to encode the sequence of tokens representing a corresponding syntax element.

An encoder converts categorial values into numerical values. The encoders 916, 918 may be a Bag of Words (BoW) encoder, a Neural Bag of Words (NBoW) encoder, a Long Short-Term Memory (LSTM) or transformer encoder model, which are trained to encode the tokens representing the features of a focal method $f_i$ and a particular syntax element source code snippet $s_j$ and returns a corresponding vector embedding $E_f(f_i)$ and $E_s(s_j)$. It should be noted that the focal method encoder, $E_f$, and the syntax element encoder, $E_s$, may be the same type of encoder. The embeddings construct a measure of their similarity.

Each encoder 916, 918 learns an embedding for each subtoken in isolation and then combines the subtoken embeddings into a sequence embedding for the entire sequence. The distance computation component 920 receives the focal method features embedding 916 and the syntax element embedding 918 of each pair and computes the distance between the two embeddings. The distance computation component 920 may utilize a cosine similarity function to compute the distance. The cosine similarity is the cosine of the angle between the vectors representing the query and source code snippet embeddings.

The encoders 916, 918 update the embedding weights by performing a gradient descent on the cosine similarity across all the input sequences in the bi-encoder training dataset until convergence is achieved. The result is a joint embedding space with close embeddings for a focal method feature embedding and its related syntax element embedding. This is achieved by the encoders minimizing the loss function:

$$\frac{1}{N}\sum_i \log\left(\frac{\exp(Es(si)*Ef(fi))}{\Sigma_j \exp(Es(sj)*Ef(fj))}\right),$$

where there are N pairs of focal method features/syntax element $(f_i, s_i)$, where $s_i$ is the syntax element, $f_i$ is the focal method features, $E_s$ is the syntax element encoder, and $E_f$ is the focal method features encoder.

Attention now turns to a description of the inference phase with usage of the bi-encoder to select syntax elements for the context.

Inference Phase—Second Aspect

Figure 10:
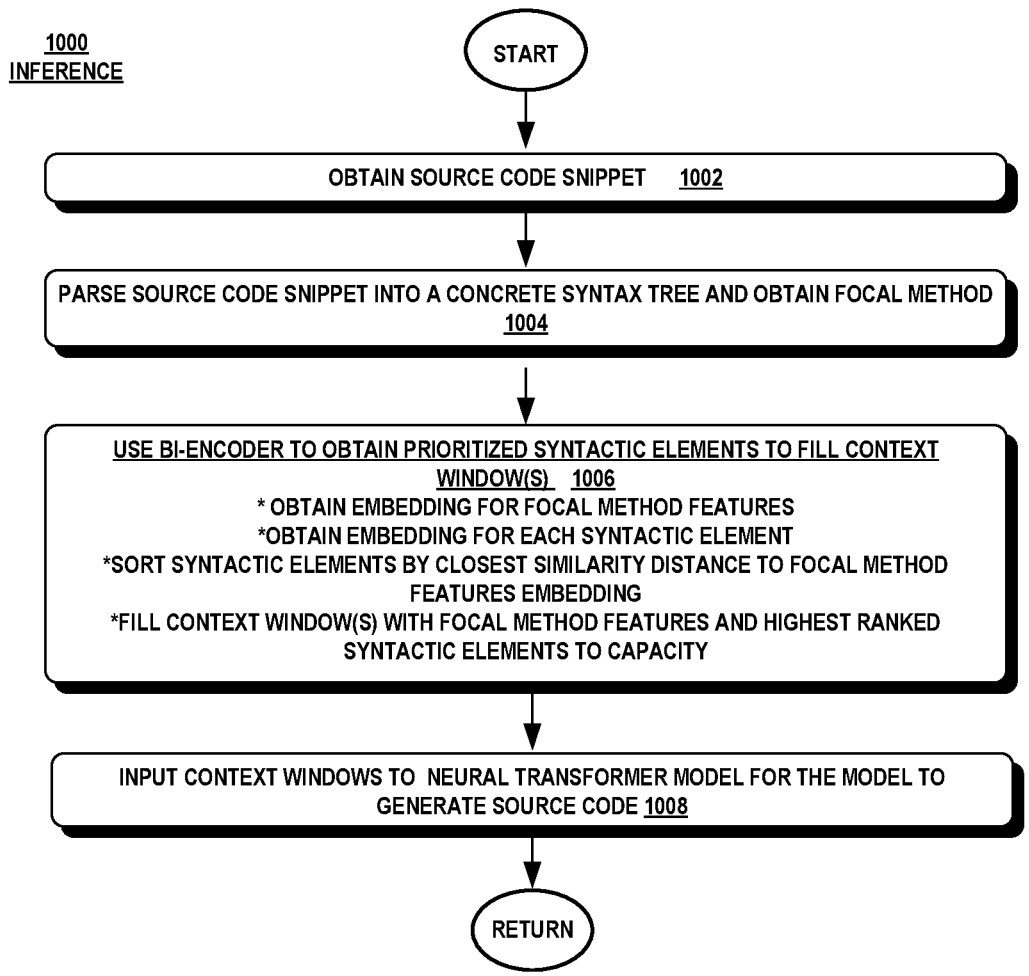
FIG. 10 is a flow diagram illustrating an exemplary method for generating the context windows including syntax elements chosen based on an embedding similarity to input to a neural transformer model.

Turning to FIG. 10, there is shown an exemplary method 1000 for constructing a context window using the bi-encoded embeddings to indicate the prioritization of the syntax elements that populate the context window.

Initially, a source code snippet is obtained. The source code snippet may be part of a source code program under development in a source code editor where the editor uses a neural transformer model to generate source code to complete a partially-formed line of source code, generate a method body given a method signature, or generate a docstring for a given focal method. (Collectively, block 1002).

The source code in the source code editor is monitored as the code is developed and continuously updated into a concrete syntax tree. The focal method is the current method where the cursor is currently positioned. (Collectively, block 1004).

At some point in the source code editor, the neural transformer model is used to generate source code, such as a line of source code to complete a partially-formed source code snippet, a method body or a docstring. In this case, the data generation engine 116 is used to generate the context window that is applied to the neural transformer model. The data generation engine 116 uses the bi-encoder to prioritize the syntax elements most closely associated with a focal method that will fill a context window (Collectively, block 1006).

The data generation engine 116 extracts the focal method features from the concrete syntax tree and extracts the syntax elements listed in the priority list. The bi-encoder is used to generate an embedding for the focal method features and an embedding for each of the syntax elements. The syntax elements are then sorted by the difference in their embedding from the embedding of the focal method features. Those syntax elements having the smallest distance is ranked higher and the highest ranked syntax elements are then used to populate the context window until the maximum capacity is reached. (Collectively, block 1006).

The input sequences of tokens in the context windows are then applied to the neural transformer model to generate source code for an intended task (block 1008).

Exemplary Operating Environment

Figure 11:
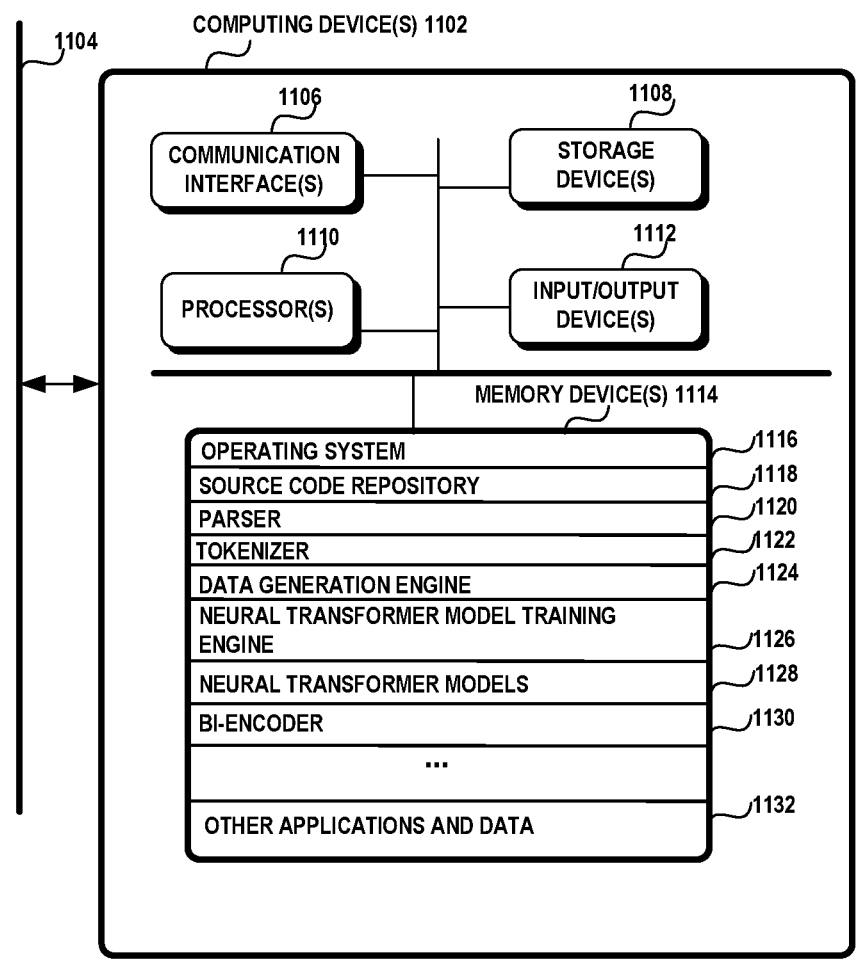
FIG. 11 is a block diagram illustrating an exemplary operating environment.

Attention now turns to a discussion of an exemplary operating environment 1100. FIG. 11 illustrates an exemplary operating environment 1100 in which one or more computing devices 1102 are used to train the neural transformer model and use the neural transformer model for a software engineering task. However, it should be noted that the aspects disclosed herein is not constrained to any particular configuration of devices. Computing devices 1102 may be configured as a cloud service that generates the neural transformer model as a service or uses the neural transformer models in a respective software engineering task. It should be noted that the operating environment is not limited to any particular configuration and other configurations are possible.

A computing device 1102 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 700 may be configured in a network environment, a distributed environment, a multi-processor environment, or a stand-alone computing device having access to remote or local storage devices.

A computing device 1102 may include one or more processors 1110, one or more communication interfaces 1106, one or more storage devices 1108, one or more input/output devices 1112, and one or more memory devices 1114. A processor 1110 may be any commercially available or customized processor and may include dual microprocessors and multi-processor architectures. A communication interface 1106 facilitates wired or wireless communications between the computing device 1102 and other devices. A storage device 1108 may be computer-readable medium that does not contain propagating signals, such as modulated data signals transmitted through a carrier wave. Examples of a storage device 1108 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 1108 in the computing devices 1102. The input/output devices 1112 may include a keyboard, mouse, pen, voice input device, touch input device, display, speakers, printers, etc., and any combination thereof.

A memory device or memory 1114 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 1114 may also include one or more external storage devices or remotely located storage devices that do not pertain to propagated signals, such as modulated data signals transmitted through a carrier wave.

A memory device 1114 may contain instructions, components, and data. A component is a software program that performs a specific function and is otherwise known as a module, program, and/or application. The memory device 1114 may include an operating system 1116, a source code repository 1118, a parser 1120, a tokenizer 1122, a data generation engine 1124, a neural transformer model training engine 1126, a bi-encoder 1128, a neural transformer models 1130, and other applications and data 1132.

A computing device 1102 may be communicatively coupled via a network 1104. The network 1104 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portion of the Public Switched Telephone Network (PSTN), plain old telephone service (POTS) network, a wireless network, a WiFi® network, or any other type of network or combination of networks.

The network 1104 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It may be appreciated that the representative methods described herein do not necessarily have to be executed in the order presented, or in any particular order, unless otherwise indicated. Moreover, various activities described with respect to the methods can be executed in serial or parallel fashion, or any combination of serial and parallel operations.

A system is disclosed comprising: one or more processors; and a memory that stores one or more programs that are configured to be executed by the one or more processors, the one or more programs including instructions to perform actions that: extract a first plurality of syntax elements from a source code program to represent a focal method and a second plurality of syntax elements to represent a context of the focal method; generate a fixed-size context window from the first plurality of syntax elements and the second plurality of syntax elements, wherein the fixed-size context window includes a first portion and a second portion, wherein the first portion includes the first plurality of syntax elements representing the focal method, wherein the second portion includes select ones of the second plurality of syntax elements representing the context of the focal method, wherein the select ones of the second plurality of syntax elements are selected based on a priority order, wherein the second plurality of syntax elements representing the context of the focal method have another scope than a local scope of the focal method; and apply the fixed-size context window to train a deep learning model to learn to predict source code based on data of the fixed-size context window.

In an aspect, the priority order includes a pre-configured list of syntax elements in a hierarchical order. In an aspect, the one or more programs include further instructions to perform actions that: choose the select ones of the second plurality of syntax elements representing the context of the focal method based on a closest distance measure to an embedding of the first plurality of syntax elements with an embedding of each of the syntax elements of the second plurality of syntax elements.

In an aspect, the first plurality of syntax elements includes a method signature of the focal method, a method docstring of the focal method, and a class name of the focal method. In an aspect, the second plurality of syntax elements include a global import statement, a method signature of a peer method of a class of the focal method, a docstring of a class of the method signature, a global expression, and/or a method body of a method of the class of the focal method. In an aspect, the first portion of the fixed-size context window includes a first number of tokens and the second portion of the fixed-size context window includes a second number of tokens, wherein the first number of tokens and the second number of tokens differ.

In an aspect, the first portion of the fixed-size context window includes a first number of tokens and the second portion of the fixed-size context window includes a second number of tokens, wherein the first number of tokens and the second number of tokens are the same.

In an aspect, the priority order for extracting the second plurality of syntax elements representing the context includes: (1) global import statements; (2) assigned values; (3) class attributes; (4) peer class method signatures; (5) class docstrings; (6) peer class method docstrings; (7) global expressions; and (8) source code bodies of peer class methods of the focal method.

A computer-implemented method is disclosed comprising: extracting a first plurality of syntax elements from a source code program to represent a focal method; generating an embedding for the first plurality of syntax elements; extracting a second plurality of syntax elements from the source code program to represent a context of the focal method, wherein the first plurality of syntax elements differs from the second plurality of syntax elements; generating an embedding for each syntax element of the second plurality of syntax elements; constructing a fixed-size context window having a first portion and a second portion; populating the first portion of the fixed-size context window with the first plurality of syntax elements; populating the second portion of the fixed-size context window with select ones of the second plurality of syntax elements having a closest embedding distance to the embedding of the first plurality of syntax elements; and applying the fixed-size context window to a deep learning model to generate source code based on data of the fixed-size context window.

In an aspect, wherein generating an embedding for the first plurality of syntax elements further comprises: obtaining a bi-encoder; and applying the first plurality of syntax elements to the bi-encoder to generate the embedding for the first plurality of syntax elements. In an aspect, wherein generating an embedding for select ones of the second plurality of syntax elements further comprises: applying a select one of the second plurality of syntax elements to the bi-encoder to generate an embedding for the select one of the syntax elements.

In an aspect, the computer-implemented method, further comprises: determining the closest embedding distance based on a cosine similarity between the embedding of the first plurality of syntax elements with the embedding of a select one of the second plurality of syntax elements. In an aspect, the computer-implemented method, further comprises: obtaining a bi-encoder, wherein the bi-encoder includes a first encoder that generates an embedding for the first plurality of syntax elements jointly with a second encoder that generates an embedding for a select one of the second plurality of syntax elements.

In an aspect, the first plurality of syntax elements includes a focal method signature, docstring of the focal method and/or class name of the focal method. In an aspect, extracting a second plurality of syntax elements from a source code program uses an order including: (1) global import statements; (2) assigned values; (3) class attributes; (4) peer class method signatures; (5) class docstrings; (6) peer class method docstrings; (7) global expressions; and (8) source code bodies of peer class methods of the focal method.

A computer-implemented method is disclosed comprising: analyzing a source code snippet having a focal method for focal method features and related syntax elements, wherein the focal method features identify a focal method, wherein the related syntax elements represent a context of the focal method, wherein the related syntax elements include at least one element of another scope than a local scope of the focal method; ranking the related syntax elements in accordance with a syntax hierarchy; constructing a fixed-size context window including a first portion and a second portion; populating the first portion with the focal method features; populating the second portion with the related syntax elements having a highest priority until the fixed-size context window reaches a maximum limit; and applying the fixed-size context widow to a deep learning model to generate source code for data of the context window.

In an aspect, the syntax hierarchy includes a pre-configured list of syntax elements. In an aspect, the computer-implemented method, further comprises: determining a priority of the related syntax elements based on an embedding distance measure between an embedding of the focal method features and each embedding of the related syntax elements. In an aspect, the computer-implemented method, further comprises: generating the embedding of the focal method features and each embedding of the related syntax elements using a bi-encoder, wherein the bi-encoder generates a joint embedding space for a target focal method features and syntax elements of the target focal method features.

In an aspect, the syntax hierarchy having an order for selecting syntax elements, wherein the order includes: (1) global import statements; (2) assigned values; (3) class attributes; (4) peer class method signatures; (5) class docstrings; (6) peer class method docstrings; (7) global expressions; and (8) source code bodies of peer class methods of the focal method.

What is claimed:
1. A system comprising:
one or more processors; and
a memory that stores one or more programs that are configured to be executed by the one or more processors, the one or more programs including instructions to perform actions that:
extract a first plurality of syntax elements from a source code program to represent a focal method and a second plurality of syntax elements to represent a context of the focal method;

generate a fixed-size context window from the first plurality of syntax elements and the second plurality of syntax elements, wherein the fixed-size context window includes a first portion and a second portion, wherein the first portion includes the first plurality of syntax elements representing the focal method, wherein the second portion includes select ones of the second plurality of syntax elements representing the context of the focal method, wherein the select ones of the second plurality of syntax elements are selected based on a priority order, wherein the second plurality of syntax elements representing the context of the focal method have another scope than a local scope of the focal method; and apply the fixed-size context window to train a deep learning model to learn to predict source code based on data of the fixed-size context window.

2. The system of claim 1, wherein the priority order includes a pre-configured list of syntax elements in a hierarchical order.

3. The system of claim 1, wherein the one or more programs include further instructions to perform actions that:

choose the select ones of the second plurality of syntax elements representing the context of the focal method based on a closest distance measure to an embedding of the first plurality of syntax elements with an embedding of each of the syntax elements of the second plurality of syntax elements.

4. The system of claim 1, wherein the first plurality of syntax elements includes a method signature of the focal method, a method docstring of the focal method, and a class name of the focal method.

5. The system of claim 1, wherein the second plurality of syntax elements include a global import statement, a method signature of a peer method of a class of the focal method, a docstring of a class of the method signature, a global expression, and/or a method body of a method of the class of the focal method.

6. The system of claim 1, wherein the first portion of the fixed-size context window includes a first number of tokens and the second portion of the fixed-size context window includes a second number of tokens, wherein the first number of tokens and the second number of tokens differ.

7. The system of claim 1, wherein the first portion of the fixed-size context window includes a first number of tokens and the second portion of the fixed-size context window includes a second number of tokens, wherein the first number of tokens and the second number of tokens are the same.

8. The system of claim 1, wherein the priority order for extracting the second plurality of syntax elements representing the context includes: (1) global import statements; (2) assigned values; (3) class attributes; (4) peer class method signatures; (5) class docstrings; (6) peer class method docstrings; (7) global expressions; and (8) source code bodies of peer class methods of the focal method.

9. A computer-implemented method, comprising:

extracting a first plurality of syntax elements from a source code program to represent a focal method;

generating an embedding for the first plurality of syntax elements;

extracting a second plurality of syntax elements from the source code program to represent a context of the focal method, wherein the first plurality of syntax elements differs from the second plurality of syntax elements;

generating an embedding for each syntax element of the second plurality of syntax elements;

constructing a fixed-size context window having a first portion and a second portion;

populating the first portion of the fixed-size context window with the first plurality of syntax elements;

populating the second portion of the fixed-size context window with select ones of the second plurality of syntax elements having a closest embedding distance to the embedding of the first plurality of syntax elements; and applying the fixed-size context window to a deep learning model to generate source code based on data of the fixed-size context window.

10. The computer-implemented method of claim 9, wherein generating an embedding for the first plurality of syntax elements further comprises:

obtaining a bi-encoder; and applying the first plurality of syntax elements to the bi-encoder to generate the embedding for the first plurality of syntax elements.

11. The computer-implemented method of claim 10, wherein generating an embedding for select ones of the second plurality of syntax elements further comprises:

applying a select one of the second plurality of syntax elements to the bi-encoder to generate an embedding for the select one of the syntax elements.

12. The computer-implemented method of claim 11, further comprising:

determining the closest embedding distance based on a cosine similarity between the embedding of the first plurality of syntax elements with the embedding of a select one of the second plurality of syntax elements.

13. The computer-implemented method of claim 10, further comprising:

obtaining a bi-encoder, wherein the bi-encoder includes a first encoder that generates an embedding for the first plurality of syntax elements jointly with a second encoder that generates an embedding for a select one of the second plurality of syntax elements.

14. The computer-implemented method of claim 9, wherein the first plurality of syntax elements includes a focal method signature, docstring of the focal method and/or class name of the focal method.

15. The computer-implemented method of claim 9, wherein extracting a second plurality of syntax elements from a source code program uses an order including: (1) global import statements; (2) assigned values; (3) class attributes; (4) peer class method signatures; (5) class docstrings; (6) peer class method docstrings; (7) global expressions; and (8) source code bodies of peer class methods of the focal method.

16. A computer-implemented method, comprising:

analyzing a source code snippet having a focal method for focal method features and related syntax elements, wherein the focal method features identify a focal method, wherein the related syntax elements represent a context of the focal method, wherein the related syntax elements include at least one element of another scope than a local scope of the focal method;

ranking the related syntax elements in accordance with a syntax hierarchy;

constructing a fixed-size context window including a first portion and a second portion;

populating the first portion with the focal method features;

populating the second portion with the related syntax elements having a highest priority until the fixed-size context window reaches a maximum limit; and applying the fixed-size context widow to a deep learning model to generate source code for data of the context window.

17. The computer-implemented method of claim 16, wherein the syntax hierarchy includes a pre-configured list of syntax elements.

18. The computer-implemented method of claim 16, further comprising:

determining a priority of the related syntax elements based on an embedding distance measure between an embedding of the focal method features and each embedding of the related syntax elements.

19. The computer-implemented method of claim 18, further comprising:

generating the embedding of the focal method features and each embedding of the related syntax elements using a bi-encoder, wherein the bi-encoder generates a joint embedding space for a target focal method features and syntax elements of the target focal method features.

20. The computer-implemented method of claim 16, wherein the syntax hierarchy having an order for selecting syntax elements, wherein the order includes: (1) global import statements; (2) assigned values; (3) class attributes; (4) peer class method signatures; (5) class docstrings; (6) peer class method docstrings; (7) global expressions; and (8) source code bodies of peer class methods of the focal method.

* * * * *